United States Patent
Eisentraut

[15] 3,666,854
[45] May 30, 1972

[54] TEST FOR THYROID HORMONE

[72] Inventor: Anna M. Eisentraut, Dallas, Tex.

[73] Assignee: Nuclear-Medical Laboratories, Inc., Dallas, Tex.

[22] Filed: July 30, 1969

[21] Appl. No.: 846,289

[52] U.S. Cl.................................424/1, 250/106 T, 424/111, 424/357
[51] Int. Cl. .......................................A61k 27/04
[58] Field of Search ........................424/1, 111, 357; 23/230; 250/106 T

[56] References Cited

UNITED STATES PATENTS

| | | | |
|---|---|---|---|
| 3,414,383 | 12/1968 | Murphy | 23/230 |
| 3,451,777 | 6/1969 | Di Guilio | 424/1 X |
| 3,516,794 | 6/1970 | Murty et al. | 424/1 X |

Primary Examiner—Benjamin R. Padgett
Attorney—Richards, Harris & Hubbard

[57] ABSTRACT

A procedure utilized in a diagnostic test for determining the level of thyroid hormone within a body fluid which includes admixing a radioactive isotope labeled hormone with a body fluid, and separating the resulting unbound hormone from the hormone bound by the hormone binding globulin and protein of the fluid by sorption of the unbound hormone by a particulate inorganic crystalline material. This sorption does not depend upon critical time or temperature limitations, and is generally conducted by thoroughly admixing the sorbent material with the solution containing the bound and unbound thyroid hormone at room temperature. The sorbent material is then separated from the resultant supernatant fluid and either the supernatant fluid or sorbent material, preferably the sorbent material, is counted with a scintillation counter to determine the labeled hormone bound to or free from the globulin.

9 Claims, No Drawings

TEST FOR THYROID HORMONE

This invention relates to diagnostic tests for the determination of the level of thyroid hormone within a body fluid. In another aspect, this invention relates to diagnostic tests which measure unsaturated binding capacity of hormone binding globulin and other proteins, and measure total thyroid hormone in blood serum. In still another aspect, this invention relates to an improved method for removing free thyroid hormones from mixtures containing hormones in a free state and hormones which are bound to hormone binding globulin and other proteins.

Various diagnostic tests are known in the art for determining thyroid function. These tests include the basal metabolism test, the thyroid uptake test and various colorimetric and chemical procedures for determining the level of thyroxine iodine in the blood. Among the most accurate tests available are the diagnostic tests which utilize radioisotope labeled hormone to indirectly determine the level of thyroid hormones, thyroxine ($C_{15}H_{11}I_4NO_4$), and triiodothyronine ($C_{15}H_{12}I_3NO_4$) present in body fluids. Specifically, these tests include a test commonly referred to as the T-3 test which measures the unsaturated binding capacity of thyrobinding globulin and other proteins within a body fluid such as blood, and the test commonly referred to as the T-4 test which measures the total quantity of hormone within a sample of blood serum.

Both of these tests include the steps of adding the radioisotope labeled hormone to a solution containing a sample of hormone produced within the body and thyrobinding globulin, separating the resulting thyrobinding globulin containing bound hormone from the resulting unbound hormone, and counting the radioactivity of either the bound or unbound hormone. This counting procedure will indirectly indicate the amount of endogenous hormone which is bound to the natural globulin and protein bounding sites within the blood.

Thus, both the T-3 and the T-4 tests depend for their accuracy upon the efficient separation between the bound and unbound thyroid hormone in the test sample. The currently available methods for removal of these hormones include ion exchange resins such as the ion exchanger having strongly basic amino or quatenary ammonium groups as disclosed in U.S. Pat. No. 3,414,383. These organic ion exchange resins can be either in loose forms, or incorporated in polyurethane sponges as disclosed in U.S. Pat. No. 3,206,602, or enclosed in porous bags or the like. Another available method involves a selective adsorption of the free hormones by charcoal which has been coated with suitable proteins.

The major disadvantages of all the currently available separation methods described above is that the binding of the hormones to the separation materials is both time and temperature dependent, so that the binding of the hormones to these materials increases with time and increasing temperatures. For example, as time increases, much of the protein-bound thyroid hormone is ultimately bound to the ion exchange resin. In addition, from one to two hours are required for complete binding to take place with the ion exchange resins, further limiting the number of measurements which are possible in the laboratory. Also, coated charcoal must be enclosed within a heat block under controlled time and temperature conditions during the separation procedure. Thus, careful timing and controlled temperatures s are necessary in the conventional T-3 and T-4 test when separating the thyroid hormones bound to the natural binding sites within the blood (thyrobinding globulin and other proteins) from the nonbound thyroid hormones.

Therefore, one object of this invention is to provide improved diagnostic tests for determining the level of thyroid hormone in a body fluid.

Another object of this invention is to provide an improved method of separating thyroid hormone bound to thyroid-binding globulin and other proteins from nonbound thyroid hormones which method is not critically dependent on time or temperature conditions.

According to the invention, the separation of free hormones from hormones bound to natural binding sites (thyrobinding globulin and other proteins) in a diagnostic test is carried out by sorption of the free hormones by particulate inorganic crystalline lattice material, preferably in colloidal form. It has been discovered that the sorption of the free hormones by the inorganic crystalline material is neither critically time nor temperature dependent, and results in highly efficient, fast, and reproducible results. This separation is conducted by adding a measured amount of the inorganic crystalline sorption material to the sample, thoroughly admixing the sorption material with the solution for a few seconds, and separating, (such as centrifugation) the resultant supernatant fluid containing the protein-bound hormones from the resulting material containing the free hormones. Either the supernatant fluid or the colloidal material can be counted in a scintillation well counter; however, it is preferred that the colloidal material be counted.

The particulate inorganic crystalline material which can be used within the scope of this invention includes the phosphates, oxides, hydroxides, silicates, aluminates, and sulfates, of the metallic elements in groups IA, IIA, IIIA, IIB and VIII of the Periodic Table as illustrated on page B–2 of the Handbook of Chemistry and Physics, Chemical Rubber Publishing Company (1964). Examples of suitable materials include calcium carbonate, calcium phosphate, calcium oxide, calcium hydroxide, calcium silicate, calcium aluminate, calcium sulfate, magnesium carbonate, magnesium phosphate, magnesium oxide, magnesium hydroxide, magnesium silicate, magnesium aluminate, magnesium sulfate, aluminum carbonate, aluminum phosphate, aluminum oxide, aluminum hydroxide, aluminum silicate, aluminum sulfate, potassium carbonate, potassium phosphate, potassium oxide, potassium hydroxide, potassium silicate, potassium aluminate, potassium sulfate, iron carbonate, iron phosphate, iron oxide, iron hydroxide, iron silicate, iron aluminate, iron sulfate, barium carbonate, barium phosphate, barium oxide, barium hydroxide, baRium silicate, barium aluminate, barium sulfate, zinc carbonate, zinc phosphate, zinc oxide, zinc hydroxide, zinc silicate, zinc aluminate, zinc sulfate, and mixed salts thereof.

Some specific examples of commonly occurring materials which can be used within the scope of this invention include: Opal, $(Si(OH)_4+SiO_2)$; Waterglass, $Si_4O_9Na_2$; Kaolinite, $Al_2(SiO_5,oh._4)$; Dickite, $Al_2(Si_2O_5)(OH)_4$; Nacrite, $Al_2(Si_2O_5)(OH)_4$; Metahalloysite, $Al_2(Si_2O_5)(OH)_4$; Halloysite, $Al_2(SiO_3,oh._3)$; Attapulgite, $Mg_3(Si_4O_{10})(OH)_2(OH)\cdot 2H_2O$, $Al(Si_4O_{10})(OH)_2$ Pyrophyllite, $Al_2(Si_4O_{10})(OH)_2$; Ialc, $Mg_3(Si_4O_{10})(OH)_2$; Montmorillonite, $Al_2(Si_4O_{10})(OH)_2\cdot xH_2O$, $Mg(Si_4O_{10x)Hn2}\cdot xH_2O$; Nontronite, $Fe_2(Si_4O_{10})(OH)_2\cdot xH_2O$, $Mg(Si_4O_{10})(OH)_2\cdot xH_2O$; Beidellite, $Al_2(Si_4Al0_{10})(OH)_2\cdot xH_2O$, $Mg(Si_4Al0_{10})(OH)_2\cdot xH_2O$; Saponite, $Mg_3(Si_4O_{10})(OH)_2\cdot xH_2O$, Illite, $K_yAl_2(Si_{4y})O_{10}$, $Fe_2\cdot Mg_2\cdot Mg_3(Si_{4-y}\cdot Al_y)O_{10}$; Muscovite, $K\cdot Al_2(AlSi_3O_{10})(OH)_2$; Paragonite, $Na\cdot Al_2(AlSi_3O_{10})(OH)_2$; Phlogonite, $K\cdot Mg_3(AlSi_3O_{10})(OH)_2$; Biotite, $K\cdot (Mg_1Fe)_3(AlSi_3O_{10})(OH)_2$; Margarite, $Ca\cdot Al_2(Al_2\cdot Si_3\cdot O_{10})(OH)_2$.

The most preferred inorganic crystalline sorbent materials include the silicates, particularly magnesium silicate and aluminum silicate. Other preferred sorbent materials are calcium phosphate, silicic acid, aluminum hydroxide, calcium oxide, and magnesium oxide.

The inorganic crystalline sorbent material is preferably in colloidal form (an average diameter of from $10^{-7}$ to $10^{-4}$ centimeters). However, the sorbent material can have a non-colloidal particle size of from 4 mesh to 325 mesh. (U.S. Standard). When using non-colloidal particles, it is preferred that particle size range from 10 mesh to 325 mesh (U.S. Standard).

In operation the particulate inorganic sorbent material is added to the test sample and thoroughly admixed therewith. For example, a preweighed amount of sorbent is added to the test sample within a test tube, and thoroughly admixed for example, for about 30 seconds, by touching the bottom of the test tube to a Vortex mixer. After a period of 2 minutes, the test tube can be placed within a conventional centrifuge to separate the inorganic sorbent material from the resulting supernatant fluid. This procedure can occur at any convenient temperature, for example, room temperature. Additionally, the period of contact between the inorganic sorbent material and the test sample is not critical. For example, the material can be allowed to sit for any convenient period of time after the mixing. It is noted that the sorbent should remain in contact with the test sample for a period of at least about 2 minutes before the centrifugation step.

This invention basically constitutes improved diagnostic tests which measure either of (1) unsaturated binding capacity of the thyrobinding globulin and other proteins within body fluids, or (2) the total serum thyroxine within body fluids. The body fluid being treated is normally serum, but unknown amounts of thyroid hormone (thyroxine and triiodothyronine) can be determined in blood plasma or whole blood, and the like. The basic improved tests of this invention are described as follows:

TEST FOR UNSATURATED BINDING CAPACITY OF THYROBINDING GLOBULIN AND OTHER PROTEINS

In this test, a tracer quantity of radioactive isotope labeled hormone is admixed with a known amount of body fluid (serum), the inorganic sorbent material is added to the resultant sample solution, thoroughly admixed therewith, and then separated therefrom such as by centrifugation. At this point, either the resulting supernatant fluid from the test solution, or the separated inorganic sorbent material can be counted in a scintillation well counter to determine the amount of radioactive isotope labeled hormone therein. This determination will indirectly show the level of hormone which was originally bound to the binding sites, thyrobinding globulin and other proteins within the serum. A preferred method is as follows:

Initially a tracer quantity of radioactive isotope labeled triiodothyronine or thyroxine, preferably triiodothyronine, is diluted in 0.1 percent albumin in barbital buffer (diethyl barbituric acid pH 8.6, 0.075 M). The hormone utilized is labeled with either radioactive $I^{131}$ or $I^{125}$ (or theoretically, any radioactive isotope of iodine, tritium, nitrogen or carbon). The $I^{125}$ is preferably because it has a half life of 60 days and it can be employed for at least 6 weeks; whereas, $I^{131}$ has a half life of 8 days and has a useful shelf life of about 2 weeks. The resulting mixture is added to two milliliters of barbital buffer (pH 8.6, 0.075 M). It is noted that the barbital buffer could be employed with an alternate pH and molarity and other buffers could be used. For example, the barbital buffer can be used in a pH range of from 6.8 to 9.6, and other buffers such as tris (hydroxymethyl) aminomethane, tris (hydroxymethyl) aminomethane-maleate, sodium phosphate, and potassium phosphate can be used. It is possible with these other buffers to operate at a pH as low as about 5. In addition, saline solution or distilled water can be used in place of the buffer.

Next, 0.1 milliliter of the sample serum (from the patient) is added to the resulting mixture. It is noted that various volumes of the serum can be employed, but this amount is preferred in that it yields the greatest difference between normal and abnormal sera.

At any convenient time after the serum is added, the particulate inorganic crystalline sorbent can be added. For example, pre-weighed aliquots of any of the above described inorganic crystalline sorbents can be utilized. Other quantities of these sorbents may be employed for example, from 20–600 mg, or more. however, optimum quantities were selected as follows: A tablet in which 50 milligrams of $Mg_3(SiO_4O_{10})(OH_2$ is bonded with 80 milligrams of acacia is added to each sample within a test tube. Suitable tablets are produced by Goldleaf Pharmaceutical Company, New Jersey. After the addition of the tablet to the test tube, the sample is vigorously agitated for about 30 seconds by touching the bottom of the test tube to a Vortex mixer.

At any convenient time, for example, between 5 minutes and 2 hours after the coolloidal material is suspended within the sample solution, the test tubes are centrifuged to separate the colloid from the resulting solution. For example, the material is centrifuged at approximately 2,400 rpm for 5 minutes. The resulting supernatant fluid is then poured off, and the test tube turned upside down to drain on a gauze sponge. The colloidal material is packed very tightly in the bottom of the tube and is not removed by the latter drainage procedure.

At this point, either the discarded supernatant fluid or the packed sorbent can be counted in the scintillation well counter. However, it is preferred that the packed sorbent be counted. The per cent free radioactive hormone is determined by determining the ratio of the sample counts per minute from the solvent material to the total counts per minute of standard amount of radioactive hormone which is equivalent to the total radioactive hormone initially added to the sample. This is accomplished by preparing a standard sample of the radioactive hormone diluted with water to the same approximate volume as the packed sorbent occupies in the bottom of the test tube (about 0.2 milliliters), and counting the resulting solution to establish the standard counts per minute. In this manner the counting efficiency of this standard will be identical to the counting efficiency of the unknown.

The normal range employing the above described method with 50 milligrams of the magnesium silicate is 34–44 percent. Hypothyroidism and pregnancy yield values below the normal range while values in hyperthyroid patients are higher.

TEST FOR TOTAL SERUM THYROXINE

Basically, this test is directed toward the measurement of the total amount of thyroxine within a sample of serum by "competitive binding" to thyrobinding globulin, wherein the thyroxine is initially liberated from serum proteins, and admixed with a standard solution of thyrobinding globulin and labeled thyroxine. After this, the unbound thyroxine is removed from the resulting solution with the inorganic crystalline sorbent and then separated from the remaining labeled thyroxine which is bound to the globulin, Either the bound or the free fraction is then determined by counting techniques (in a scintillation well counter).

The thyroxine is liberated from serum proteins by either precipitation or denaturation. This can be accomplished with a variety of organic solvents such as methanol, ethanol, ethanol and n-butanol, acidified 2, 2' dimethyoxypropane, and the like. Since, regardless of the solvent employed, some of the endogenous thyroxine will be lost in the protein precipitate, it is preferable to obtain individual recovery values on each serum sample assay. This is true because the use of so-called average recovery value proposed by most investigators results in an error of approximately ± 9 percent. A preferred method of determining percent recovery is as follows: A solution (hereinafter called Solution A) containing approximately 50 microcuries of thyroxine containing either $I^{125}$ or $I^{131}$, 15 milliliters of normal human serum and 5 milliliters of propylene glycol is diluted in 500 milliliters of barbital buffer (pH 8.6, 0.075 M). Next, 0.1 milliliter of this solution is added to each 1 milliliter serum sample. At this time, in order to calculate individual recovery values, 0.1 milliliter of this solution is also added to 0.4 milliliter of water and set aside for derivation of total counts per minute. To each of these one milliliter serum samples, 4 milliliters of 5 percent methanol in 95 percent ethanol is then added thereto within a test tube. The resulting solution is mixed on a Vortex mixer for about 30 seconds and is allowed to set for about 5 minutes thereafter. The test tubes are then centrifuged at speeds to yield a completely clear supernatant. The protein precipitate is discarded. Next, 0.5 milliliter of the supernatant fluid is counted and compared with the counts derived from the standard sample to determine the percent recovery of thyroxine from each sample.

After this, 0.5 milliliters of the supernatant from each sample test tube is transferred to another test tube and dried under forced air or nitrogen. Drying may be expedited by placing the tubes in a water bath maintained at 45°–60° C. The drying operation will take approximately 45 minutes. The drying operation will effectively remove the solvent therefrom and leave a deposit of thyroxine in the tube. After the drying operation, one milliliter of the radiosotope labeled thyroxine solution described above (Solution A) is added to each sample test tube. The mixture is then shaken to assure the complete dissolution of the previously dried material contained therein. For example, each tube is shaken three times during a 15 minute equilibration period.

After the dissolution of the dried precipitate within the radioactive isotope solution, 50 milligrams of the inorganic crystalline sorbent is added to remove the free thyroxine therefrom, and the percent of radioactivity sorbed to the colloid is determined. If desired, the percent radioactivity within the resulting supernatant can be determined; however, it is preferred to determine the percent of radioactivity contained within the sorbent.

The microgram concentration of thyroxine is next determined from a standard curve. The standard curve can be prepared as follows:

Unlabeled thyroxine (sodium levothyroxine which is equivalent to 0.05 micrograms of thyroxine per milliliter) is diluted in 0.1 percent albumin diluted in a barbital buffer. From this solution, four standard solutions are prepared. The standard solutions contain 5, 10, 15 and 20 nanograms, respectively, of the unlabeled thyroxine as prepared above in b 1 milliliter of the radioisotope labeled thyroxine standard solution (Solution A). An additional milliliter of this standard solution is prepared with no unlabeled thyroxine added. 50 milligrams of the particulate inorganic crystalline material, e.g., colloidal magnesium silicate, are added to each of the above-described 5 standard solutions to determine the percent of free thyroxine in the manner as described previously. After this determination, a standard curve is plotted on linear graph paper with nanogram or microgram concentration (ranging from 0 to 20 nanograms) plotted on the abscissa, and percent thyroxine bound to the sorbent plotted on the ordinate.

It is noted at this point since this assay utilizes the so-called principle of "competitive protein binding," an increase in the total hormone concentration decreases the percentage of labeled hormone which can be bound to a fixed quantity of standard serum. Thus, since the colloid binds only the free thyroxine, the percent of radioactivity which is counted will increase as the concentration of thyroxine is elevated. Thus, it is preferred that concentration of the standard serum and the amount of the particulate inorganic crystalline sorbent employed should be adjusted to yield a percent binding (by the sorbent) which ranges from about 20 to about 60 percent. After the standard curve has been formed, the thyroxine concentration of each unknown test sample is obtained therefrom and corrected for dilution and percent recovery. Thus, in this example:

$$\text{Nanograms/ml. serum} = \frac{\text{aliquot concentration} \times 10.2}{\% \text{ recovery} \times 100}$$

These values are usually corrected to be reported as micrograms per 100 milliliters (microgram percent) of serum. The normal range is 5.2 to 13.8 microgram percent. Thus, since thyroxine is 65.3 percent iodine, the normal range will be equivalent to 3.4–9 microgram percent of thyroxine iodine.

It is noted that in the separation procedure of this test, and in the unsaturated binding capacity test, only a 2 minute incubation period is required for the sorbent to completely bind all of the unbound hormones, yet prolonged incubation does not result in sorption of protein bound hormone. In addition, the sorption proceeds at normal room temperatures making previously required temperature control mechanisms, e.g., ice baths and/or heaters, unnecessary. It is generally preferred that the sorption process of this invention be carried out at a temperature within the range of from about 20 to about 30° C. (68° – 86° F).

It is within the scope of this invention to provide the basic ingredients of both of the above described diagnostic tests in packaged form. For example, the test kit can comprise packaged units, e.g., from about 20 to about 600 milligrams or more of the inorganic crystalline sorbent material. The sorbent material can be present in a compressed tablet form such as for example, magnesium silicate or silicic acid or any of the other described materials combined with a suitable binder, such as acacia gum or the like. The packaged kits can comprise the sorbent, a barbital buffer solution sufficient to provide an optimal pH, and a radioisotope labeled thyroxine or triiodothyronine solution. In addition, the kit can contain a standard thyrobinding globuline solution.

This invention can be more easily understood from a study of the following examples which are given for illustrative purposes only.

EXAMPLE 1

In this Example, the unsaturated binding capacity test was conducted utilizing the technique described above wherein the radioisotope labeled hormone was triiodothyronine (labeled with $I^{131}$). Ten samples were prepared using the 0.1 milliliter of serum as described in the above test.

The tests were conducted according to the procedure outlined above through the point at which the tablet containing 50 milligrams of magnesium silicate was added to the sample solution and thoroughly admixed therewith. However, at this point, the various solutions were centrifuged and then counted in a scintillation well counter after various time periods. The first sample was centrifuged immediately, and the results showed 29.9 percent of the hormone was removed by the sorbent. After two minutes the second sample was centrifuged and showed that 34.6 percent of the hormone was removed by the sorbent. Next, the third, fourth, fifth, sixth, seventh, eighth and ninth samples were centrifuged after 5, 10, 15, 30, 45, 60 and 90 minutes, respectively. The counting evidenced no deviation in percent of the hormone bound, and therefore no increase in uptake of the hormone by the sorbent material. The tenth sample was centrifuged and counted after 120 minutes to show that 34.9 percent of the hormone was removed by the sorbent.

The above tests clearly indicate that the time period is not critical in which the inorganic sorbent material must function. This sorbent material substantially immediately binds all the free hormones within the test samples, and will not either release sorbed hormone or continue to sorb hormone bound to the thyrobinding globulin or other proteins in the sample as time progresses. This quality is a definite advantage over the use of the ionic exchange resins and the coated charcoal of the prior art, since these materials can only be placed in contact with the sample solution for controlled periods of time in order to obtain reproducible results. In addition, the inorganic crystalline absorbent material of this invention functions uniformly and efficiently in normal room temperature conditions; whereas, the prior art material must be utilized under controlled temperature conditions.

EXAMPLE 2

Next, the unsaturated binding capacity test as described above, and using triidothyronine labeled with radioactive $I^{131}$ was conducted simultaneously on 10 samples of the same serum. The 10 tests were conducted simultaneously according to the exact procedure outlined above. The resulting percent hormone bound (to the sorbent) for the 10 samples were as follows: 33.6, 33.4, 33.3, 33.4, 33.!1, 33.3, 32.9, 31.5, 33.7, 34.7. The results indicated a standard deviation of only 0.79 and illustrate that the use of the inorganic crystalline sorbent material yields highly reproducible results.

EXAMPLE 3

The basic unsaturated binding capacity test which was utilized in the two above Examples was conducted on control normal serum, hypothyroid serum, and hyperthyroid serum except the quantity of serum and magnesium silicate, and total solution was varied in each run.

RUN 1

In this run, 0.2 milliliters each of the control sera was utilized together with 25 milligrams of magnesium silicate, and a total barbital solution volume of 2 milliliters. The results of the runs were as follows (percent hormone taken up by sorbent):

| | |
|---|---|
| hyperthyroid serum | 22% |
| normal serum | 13% |
| hypothyroid serum | 8.6% |

RUN 2

In run 2, 0.2 milliliters each of the control sera was utilized together with 50 milligrams of magnesium silicate and a total solution volume of 2 milliliters. The results were as follows (percent hormone taken up by sorbent):

| | |
|---|---|
| hyperthyroid serum | 41.5% |
| normal serum | 23.5% |
| hypothyroid serum | 16% |

RUN 3

In this run 0.2 milliters each of the control sera was utilized together with 100 milligrams of magnesium silicate and a total solution volume of 2 milliliters. The results were as follows (percent hormone taken up by the sorbent):

| | |
|---|---|
| hyperthyroid serum | 56.5% |
| normal serum | 42.1% |
| hypothyroid serum | 27% |

RUN 4

In this run, 0.1 milliliters each of the control sera was used together with 50 milligrams of magnesium silicate and a total sample solution volume of 2 milliliters. The results were as follows (percent hormone taken up by the sorbent):

| | |
|---|---|
| hyperthyroid serum | 54.8% |
| normal serum | 34.6% |
| hypothyroid serum | 23% |

RUN 5

In this run 0.1 milliliter each of the control sera was utilized together with 50 milligrams magnesium sulfate and 3 milliliters total sample solution. The results were as follows: (percent hormone taken up by sorbent):

| | |
|---|---|
| hyperthyroid serum | 55.8% |
| normal serum | 33.5% |
| hypothyroid serum | 21.5% |

RUN 6

In this run 0.1 milliters each of the control sera was utilized with 100 milligrams magnesium silicate and 3 milliliters total sample solution. The results were as follows (percent hormone taken up by sorbent):

| | |
|---|---|
| hyperthyroid serum | 69% |
| normal serum | 48.5% |
| hypothyroid serum | 38% |

The results indicate that any convenient quantity of the sample serum, inorganic crystalline sorbent, and total sample solution can be selected to yield diagnostic results. It is well indicated that various combinations can achieve equally broad separations. The combinations utilized in Run 4 has been found preferably because it will conveniently provide broad separations between hypothyroid, normal and hyperthyroid while utilizing a minimum quantity of sample materials.

While this invention has been explained in relation to its preferred embodiments, it is to be understood that various modifications thereof will now become apparent to one skilled in the art upon reading the specification, and it is intended to cover such modifications as fall within the scope of the appended claims.

I claim:

1. In a test for thyroid hormone wherein a known quantity of radioactive isotope labeled thyroid hormone is admixed with a sample fluid containing an unknown quantity of said thyroid hormone, and thyroid hormone binding globulin to determine the amount of said unknown hormone by counting with a scintillation counter one of (a) said labeled hormone bound to said hormone binding globulin, and (b) said labeled hormone which is not bound to said thyroid hormone binding globulin as the result of said admixing, the improvement comprising:

thoroughly admixing said sample fluid containing said known quantity of radioactive isotope labeled hormone with a particulate inorganic crystalline sorbent material selected from silicic acid and carbonates, phosphates, oxides, hydroxides, silicates, aluminates, and sulfates of the metallic elements in Groups IA, IIA, IIIA, IIB, and VIII of the Periodic Table, and mixed salts thereof for a sufficient time to cause the selective sorption to said sorbent material of hormone which is not bound to said thyroid hormone binding globulin, and separating said sorbent material from the resulting sample fluid before said counting.

2. The improved test of claim 1 wherein the said particulate inorganic crystalline sorbent material comprises colloidal magnesium silicate.

3. The improved test of claim 2 wherein said sorbing occurs at a temperature within the range of from about 20 C to about 30° C.

4. The method of claim 3 wherein said sorbing occurs during a time interval of at least about 2 minutes.

5. The improved test of claim 4 wherein said sample fluid comprises blood.

6. A method for determining the level of thyroid hormone in a sample of body fluid containing an unknown quantity of said hormone and hormone binding globulin comprising:

a. thoroughly admixing a solution of this sample with a solution containing a radioactive isotope labeled hormone and barbital and allowing the resulting solution to equilibrate;

b. thoroughly admixing the resulting equilibrated solution from step (a) with a particulate inorganic crystalline sorbent material selected from silicic acid and carbonates, phosphates, oxides, hydroxides, silicates, aluminates, and sulfates of the metallic elements in Groups IA, IIA, IIIA, IIB, and VIII of the Periodic Table, and mixed salts thereof to remove free thyroid hormone from said solution by selective sorption thereof by said sorbent material;

c. separating said sorbent from said solution; and d. counting with a scintillation counter one of (1) the free radioisotope labeled hormone in said sorbent, and (2) the bound radioisotope labeled hormone in said resulting solution.

7. The method of claim 7 wherein said sorbent material is colloidal magnesium silicate.

8. A method of measuring thyroxine in a sample solution comprising:

a. precipitating proteins from said sample solution by admixing said sample solution with an organic solvent and thereby leaving said thyroxine in solution;

b. thoroughly admixing a solution of the thyroxine from step (a) with a solution containing thyrobinding globulin, radioactive isotope labeled thyroxine, and barbital and allowing the resulting solution to equilibrate;

C. thoroughly admixing the equilibrated solution of step (b) with a particulate inorganic crystalline sorbent material selected from silicic acid and carbonates, phosphates, oxides, hydroxides, silicates, aluminates, and sulfates of the metallic elements of Groups IA, IIA, IIIA, IIB and VIII of the Periodic Table, and mixed salts thereof to remove free thyroxine therefrom by selective sorption thereof by said sorbent material;

d. separating said sorbent material from the resulting solution; and

C. counting with a scintillation counter one of (1) free labeled thyroxine removed in said sorbent, and (2) labeled thyroxine remaining in said solution.

9. The method of claim 8 wherein said sorbent material is colloidal magnesium silicate.

* * * * *

PO-1050
(5/69)

UNITED STATES PATENT OFFICE
CERTIFICATE OF CORRECTION

Patent No. 3,666,854             Dated  May 30, 1972

Inventor(s)  Anna M. Eisentraut

It is certified that error appears in the above-identified patent and that said Letters Patent are hereby corrected as shown below:

Col. 1, line 60 after "temperatures" delete "s".
Col. 2, line 36 "baRium" should be --barium--;
Col. 2, line 42 after "(SiO$_5$" delete ",oh$_4$" and insert --)(OH)$_4$--;
Col. 2, line 44 after "(SiO$_3$" delete ",oh$_3$" and insert --)(OH)$_3$--;
Col. 2, line 45 delete "Ialc" and insert --Talc--;
Col. 2, line 47 after "(Si$_4$O$_{10}$" (first occurrence), delete ")()H)$_2$" and insert --(OH)$_2$--;
Col. 2, line 66 delete "10" and insert --100--.
Col. 3, line 63 delete "(OH$_2$" and insert --(OH)$_2$--.
Col. 5, line 29 delete "b".
Col. 6, line 13 delete "globuline" and insert --globulin--;
Col. 6, line 63 delete "33.!1" and insert --33.1--.
Col. 8, line 1  delete "combinations" and insert --combination--;
Col. 8, line 2  delete "preferably" and insert --preferable--;
Col. 8, line 38 delete "20 C" and insert --20°C--;
Col. 8, line 65 delete "7" (second occurrence) and insert --6--.
Col. 9, line 3  delete "C." and insert --c--.
Col. 10, line 4 delete "C." and insert --e.--.

Signed and sealed this 31st day of October 1972.

(SEAL)
Attest:

EDWARD M. FLETCHER, JR.
Attesting Officer

ROBERT GOTTSCHALK
Commissioner of Patents